(12) United States Patent
Tian et al.

(10) Patent No.: US 12,016,036 B2
(45) Date of Patent: Jun. 18, 2024

(54) FDRA AND MCS BASED ON FREQUENCY RANGES

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Seyedkianoush Hosseini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/465,629

(22) Filed: Sep. 2, 2021

(65) Prior Publication Data
US 2023/0072077 A1   Mar. 9, 2023

(51) Int. Cl.
*H04W 72/23* (2023.01)
(52) U.S. Cl.
CPC .................................. *H04W 72/23* (2023.01)

(58) Field of Classification Search
CPC . H04W 72/0453; H04W 72/14; H04W 72/12; H04L 1/00
See application file for complete search history.

(56) References Cited

U.S. PATENT DOCUMENTS

| | | | |
|---|---|---|---|
| 2018/0167164 A1* | 6/2018 | Lin | H04L 1/08 |
| 2019/0141673 A1* | 5/2019 | Zhang | H04L 1/0025 |
| 2020/0266928 A1* | 8/2020 | Yeo | H04L 1/0003 |
| 2021/0014840 A1* | 1/2021 | Ma | H04W 72/23 |
| 2022/0304035 A1* | 9/2022 | Zhang | H04B 7/0408 |
| 2022/0338221 A1* | 10/2022 | Muruganathan | H04W 72/23 |
| 2023/0023518 A1* | 1/2023 | Lin | H04W 72/23 |
| 2023/0180245 A1* | 6/2023 | Bae | H04L 5/00 370/336 |

* cited by examiner

*Primary Examiner* — Chi Ho A Lee
(74) *Attorney, Agent, or Firm* — Procopio, Cory, Hargreaves & Savitch LLP

(57) ABSTRACT

To provide more efficient FDRA or MCS for some frequency ranges, methods, apparatuses, and computer-readable medium are provided. An example method may include receiving, from a base station and via RRC signaling, one or more FDRA or MCS configurations that are based on a frequency range. The example method may further include communicating with the base station over the frequency range, using an FDRA or MCS based on at least one of the one or more FDRA or MCS configurations.

30 Claims, 11 Drawing Sheets

FDRA AND MCS BASED ON FREQUENCY RANGES

TECHNICAL FIELD

The present disclosure relates generally to communication systems, and more particularly, to wireless communication systems with frequency domain resource allocation (FDRA) and modulation and coding scheme (MCS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a base station and via radio resource control (RRC) signaling, one or more FDRA or MCS configurations that are based on a frequency range. The memory and the at least one processor coupled to the memory may be further configured to communicate with the base station over the frequency range using an FDRA or MCS based on at least one of the one or more FDRA or MCS configurations.

In another aspect of the disclosure, a method, a computer-readable medium, and an apparatus at a base station are provided. The apparatus may include a memory and at least one processor coupled to the memory. The memory and the at least one processor coupled to the memory may be configured to transmit, to a UE and via RRC signaling, one or more FDRA or MCS configurations that are based on a frequency range. The memory and the at least one processor coupled to the memory may be further configured to communicate with the UE over the frequency range using an FDRA or MCS based on at least one of the one or more FDRA or MCS configurations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
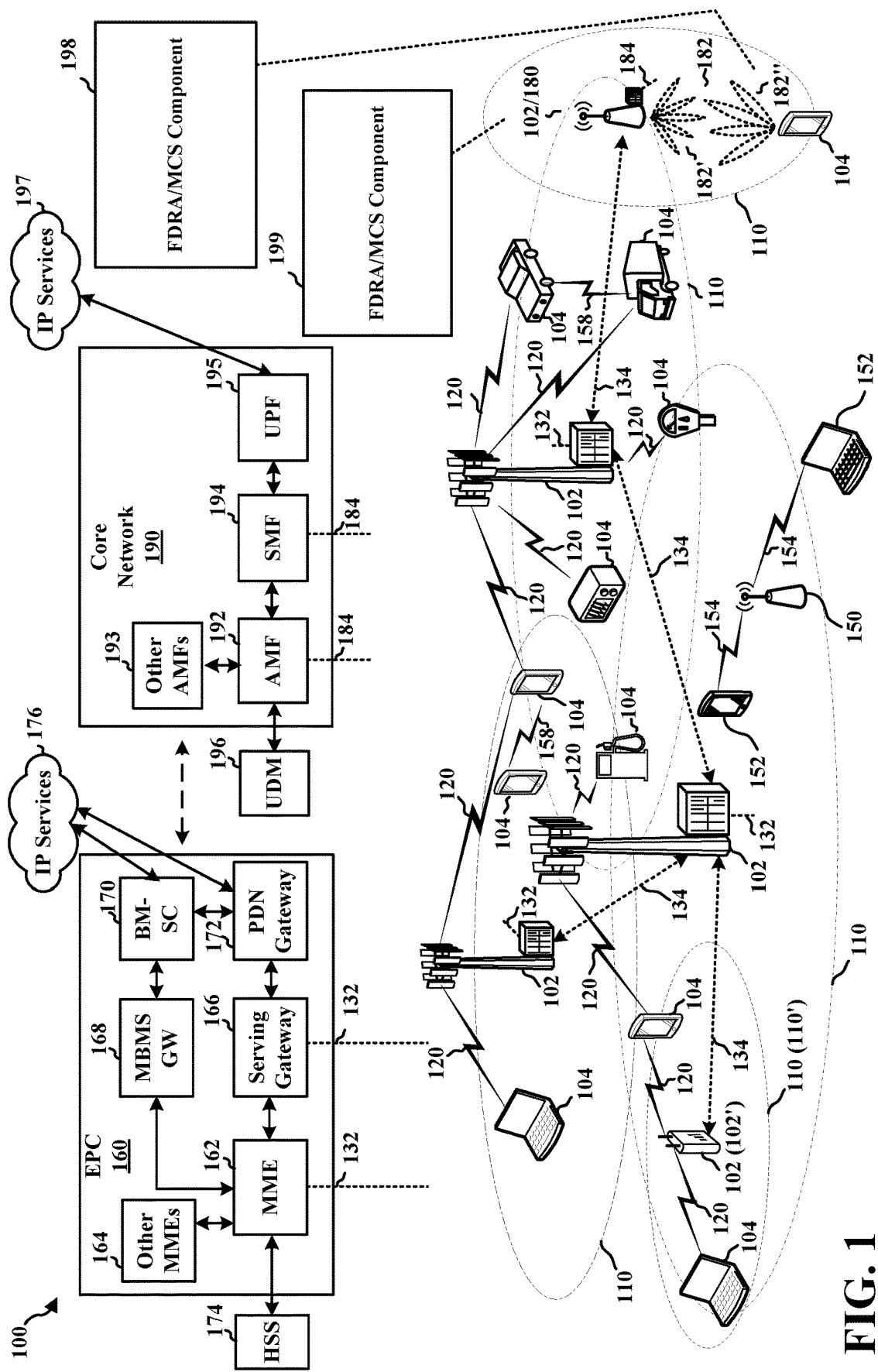
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), or other frequency ranges such as 52.6 GHz-114.25 GHz, which may be referred to as "FR4" herein ( ) or 114.25 GHz-300 GHz, which may be referred to as "FR5" herein. Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an FDRA or MCS component 198. In some aspects, the FDRA or MCS component 198 may be configured to receive, from a base station and via RRC signaling, one or more FDRA or MCS configurations that are based on a frequency range. In some aspects, the FDRA or MCS component 198 may be further configured to communicate with the base station over the frequency range using an FDRA or MCS based on at least one of the one or more FDRA or MCS configurations.

In certain aspects, the base station 180 may include an FDRA or MCS component 199. In some aspects, the FDRA or MCS component 199 may be configured to transmit, to a UE and via RRC signaling, one or more FDRA or MCS configurations that are based on a frequency range. In some aspects, the FDRA or MCS component 199 may be further configured to communicate with the UE over the frequency range using an FDRA or MCS based on at least one of the one or more FDRA or MCS configurations.

Although the following description may be focused on 5G NR, the concepts described herein may be applicable to other similar areas, such as LTE, LTE-A, CDMA, GSM, and other wireless technologies.

Figure 2:
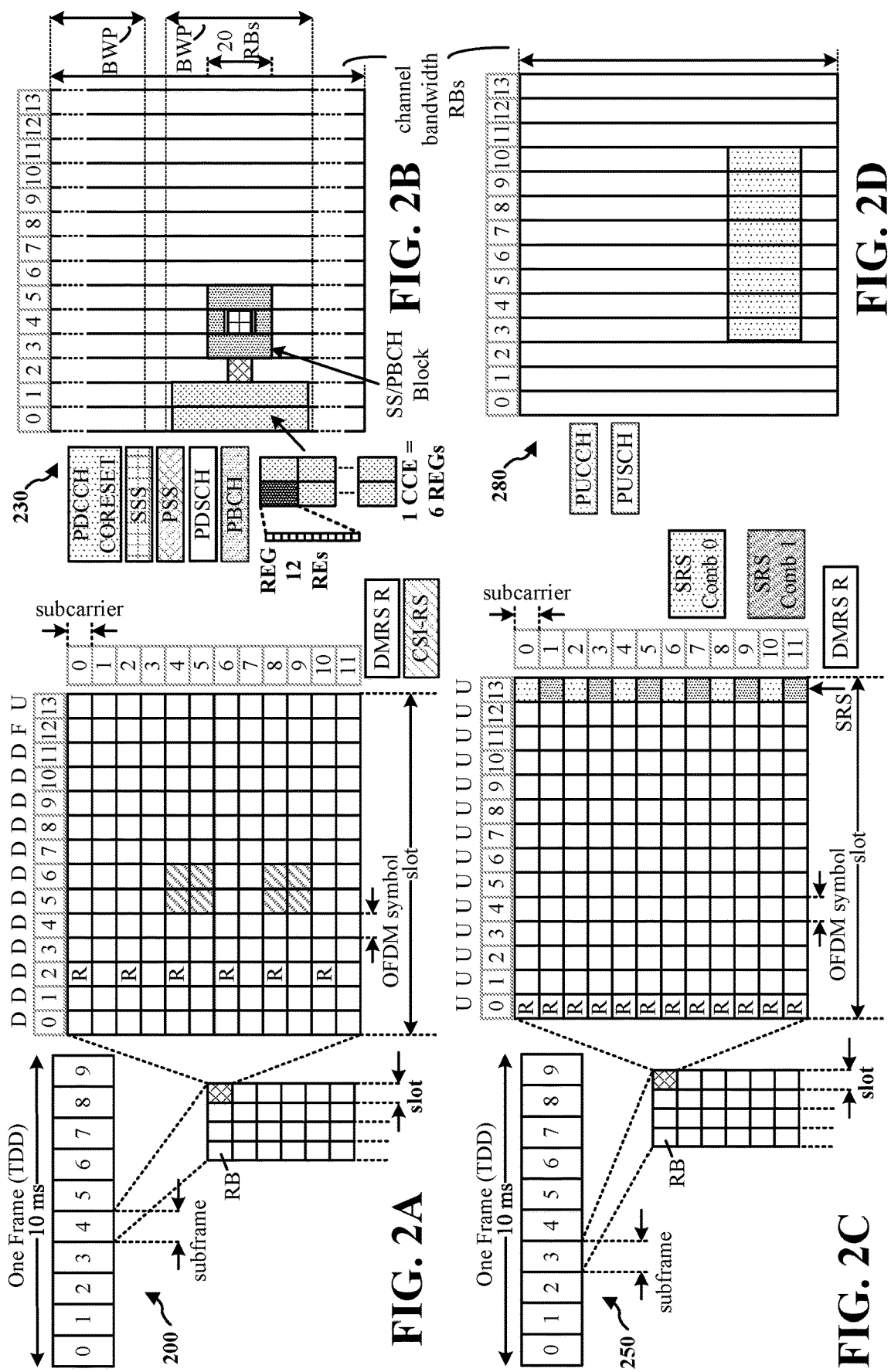
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2μ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
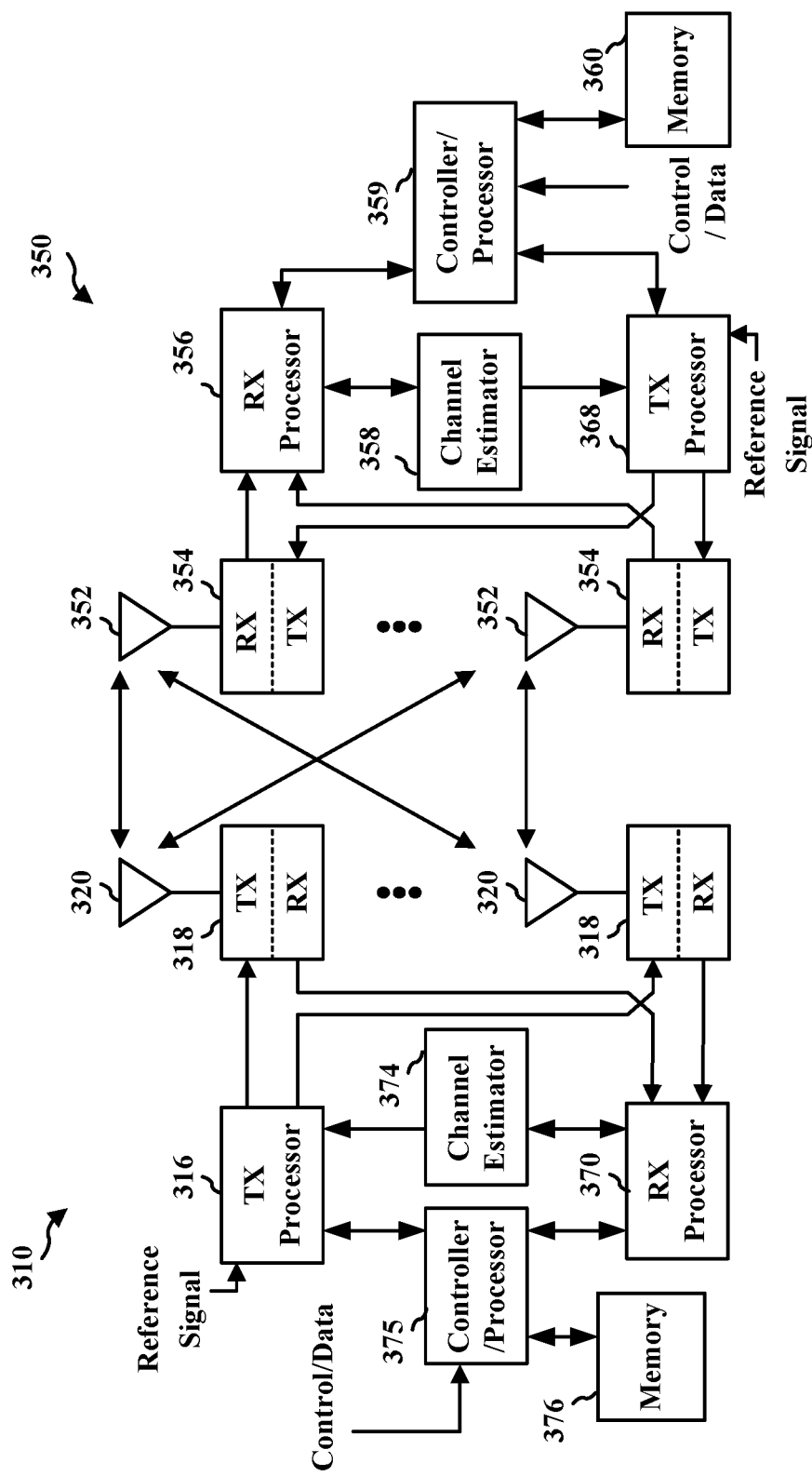
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the FDRA or MCS component 198 of FIG. 1.

At least one of the TX processor 316, the RX processor 370, and the controller/processor 375 may be configured to perform aspects in connection with the FDRA or MCS component 199 of FIG. 1.

For UEs operating in high frequency ranges, such as frequency range 71 GHz~114.25 GHz (which may be referred to herein as "FR4"), the UEs may share some characteristics that may be different compared to UEs operating in other frequency ranges. FR4 may be used in an environment where a lot of the wireless devices within one area are low mobility or stationary. Therefore, FR4 may often be used for fixed point-to-point or fixed point-to-multi-point use cases. An example fixed point-to-point use case may include a stationary UE in communication with a stationary base station or another stationary UE. An example fixed point-to-multi-point use case may include a base station or a stationary UE in communication with one or more stationary UEs. Even when the UEs operating in FR4 are not stationary, the UEs may also have a low-mobility (e.g., pedestrians carrying mobile phone and moving at a slow speed). Therefore, various aspects related to FR4 of a communication system may be more optimized toward low mobility or stationary use cases.

Other specifications, such as effective isotropic radiated power (EIRP) specifications, may also be different for FR4. If an antenna that is effectively a point source and the antenna radiates RF energy equally in all directions (in three dimensional space), then the signal strength measured at a set distance may be the same regardless of the direction. The antenna may be referred to as radiating "isotropically." Such an antenna may also be said to have unity gain or no gain. If a non-isotropic or directional antenna is used to measure the signal strength at the same distance (compared with using the isotropic antenna) and the input power was varied to get the same reading, then the radiated power in that specific direction may be equivalent to the isotropic antenna with a given input power. The power that may be radiated by the isotropic antenna to give the equivalent signal strength as the non-directional antenna in the direction of the directional antenna's strongest beam may be the EIRP. EIRP specifications for FR4 may be much higher than FR2. For example, for FR4, up to 85 decibel milliwatts (dBm) may be used. In comparison, as an example, for FR2, up to 55 dBm may be used. To increase the EIRP for FR4, narrower beams may be used. As a result, a large number of beams may be used.

Figure 4:
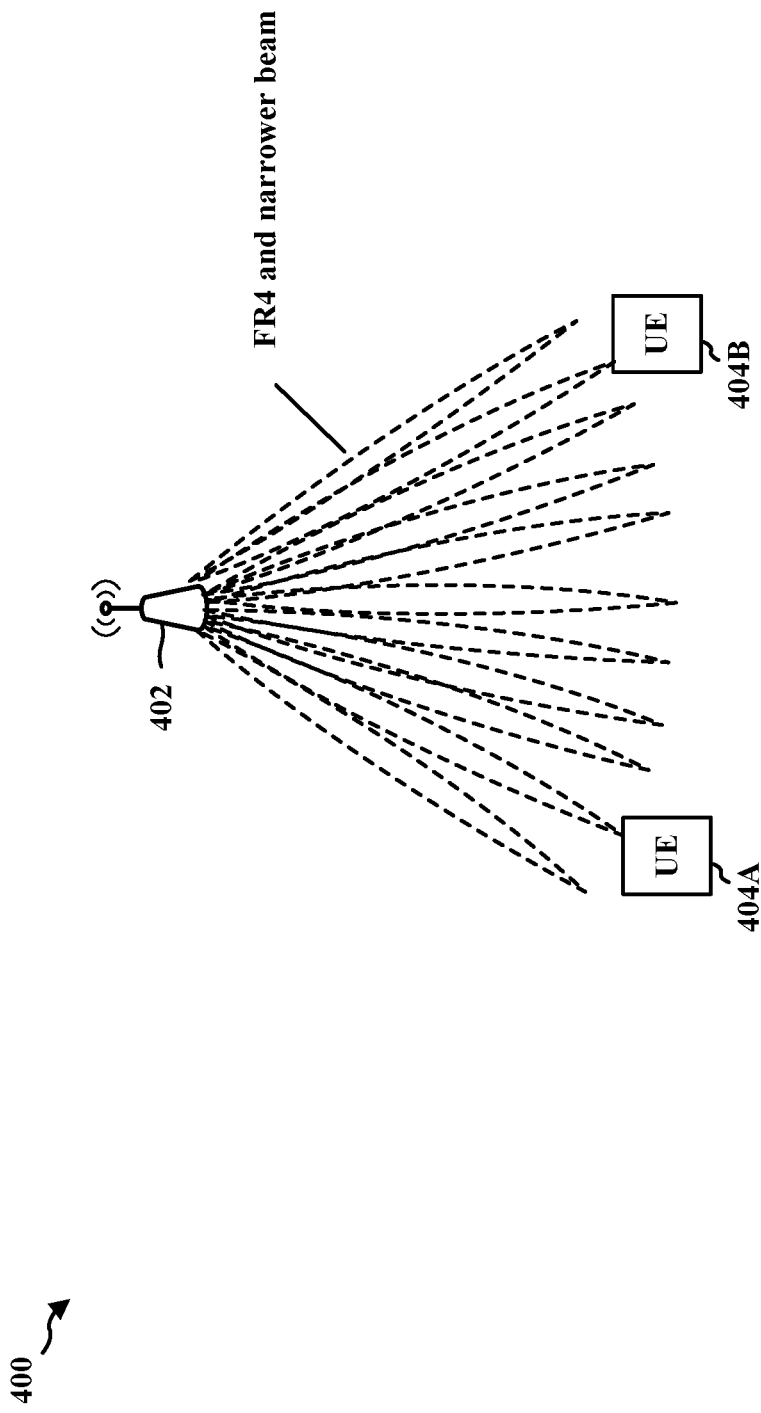
FIG. 4 is a diagram illustrating communication between a base station and UEs.

Because the beams may be narrower, each beam may serve a limited amount of UEs. In extreme cases, one beam may serve one UE and communication may be point-to-point for that beam. For example, FIG. 4 is a diagram 400 illustrating communication between a base station 402 and UEs 404A and 404B. As illustrated in FIG. 4, the base station 402 may communicate with the UE 404A using a first beam and may communicate with the UE 404B using a second beam. The communication between the base station 402 and the UEs 404A and 404B may be point-to-point on the first beam and the second beam. FR4 may be associated with other characteristics. For example, less interference may be anticipated for communications in FR4. More stable channel (in other words, lower channel variation) may also be anticipated for communications in FR4. Line of sight (LOS) may also be more likely for wireless devices in communication based on FR4.

Based on the frequency range and anticipated characteristics of communications in different frequency ranges, such as FR4, example aspects herein may provide FDRA or MCS signaling that may be more efficient. For example, with fewer number of UEs per beam and with more stable channels, an FDRA or MCS field in downlink control information (DCI) may be accordingly altered to facilitate more efficient communication. Different formats of DCI may provide different scheduling. For example, DCI format 0_0 may be a fallback format that may provide scheduling of a PUSCH in one cell. DCI format 0_1 may be a non-fallback format that may provide scheduling of a PUSCH in one cell. DCI format 1_0 may be a fallback DCI format used for allocating downlink resources for a PDSCH. DCI format 1_1 may be a non-fallback DCI format used for allocating downlink resources for a PDSCH. DCI format 2_0 may be used for the notification of slot format information (to dynamically change the slot format). DCI format 2_1 may be used for notifying the PRB(s) and OFDM symbol(s) where a UE may assume no transmission is intended for the UE. DCI format 2_2 may be used for the transmission of transmit power control (TPC) commands for a PUCCH and a PUSCH. DCI format 2_3 may be used for the transmission of a group of TPC commands for SRS transmissions by one or more UEs. An FDRA field for indicating FDRA may be included in various DCI formats.

A DCI may be associated with different frequency domain resource allocation types, such as allocation type 0 and allocation type 1. If the scheduling DCI is configured to indicate the downlink resource allocation type as part of a frequency domain resource assignment (e.g., indicate by a frequency domain resource assignment field) by setting a higher layer parameter resource allocation in a PDSCH configuration to dynamic switch, for DCI format 1_1 or 1_2, the UE may use downlink resource allocation type 0 or type 1 as defined by the DCI field. Otherwise the UE may use the downlink frequency resource allocation type as defined by a higher layer parameter for resource allocation.

If a bandwidth part indicator field is not configured in the scheduling DCI or the UE does not support active BWP change via DCI, the RB indexing for downlink type 0 and type 1 resource allocation may be determined within the UE's active bandwidth part. If a bandwidth part indicator field is configured in the scheduling DCI and the UE supports active BWP change via DCI, the RB indexing for downlink type 0 and type 1 resource allocation may be determined within the UE's bandwidth part indicated by bandwidth part indicator field value in the DCI. The UE may, upon detection of a PDCCH intended for the UE, determine the downlink bandwidth part and then determine the resource allocation within the bandwidth part.

Under allocation type 0, multiple number of consecutive RBs may be bundled into a resource block group (RBG) and a PDSCH or a PUSCH may be allocated in the multiples of RBGs. A resource block assignment information may include a bitmap indicating the RBGs that are allocated to the UE. The RBG may be a set of consecutive virtual RBs defined by a higher layer parameter RBG size configured by a configuration, such as a PDSCH configuration or a PUSCH configuration. In some wireless communication systems, the RBG size may be defined based on Table 2 below:

TABLE 2

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

For resource allocation type 1, in downlink resource allocation of type 1, the resource block assignment information may indicate to a UE a set of contiguously allocated non-interleaved or interleaved virtual resource blocks within an active bandwidth part. A downlink type 1 resource allocation field may include a resource indication value (MV) corresponding to a starting virtual resource block and a length of contiguously allocated resource blocks. In uplink resource allocation of type 1, the resource block assignment information may indicate to a UE a set of contiguously allocated non-interleaved virtual resource blocks within the active bandwidth part. An uplink type 1 resource allocation field may also include a MV corresponding to a starting virtual resource block and a length of contiguously allocated resource blocks.

MCS may define the numbers of useful bits which can be carried by one symbol. MCS may also define a target code rate. For example, MCS may define the number of useful bits that may be carried by one RE and may also define a target code rate. In some wireless communication systems, MCS may be defined based on a MCS table, such as Table 3 below:

TABLE 3

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

In some wireless communication systems, neither the MCS table that defines the MCS nor the RBG size table that defines RBG size are based on the frequency range in which a UE may operate. Therefore, such MCS or RBG size may not consider the characteristics of the UEs that operate in a certain frequency range. Some example aspects provided herein may provide MCS and RBG configurations that may be based on the frequency range, which may improve communication efficiency.

Figure 5:
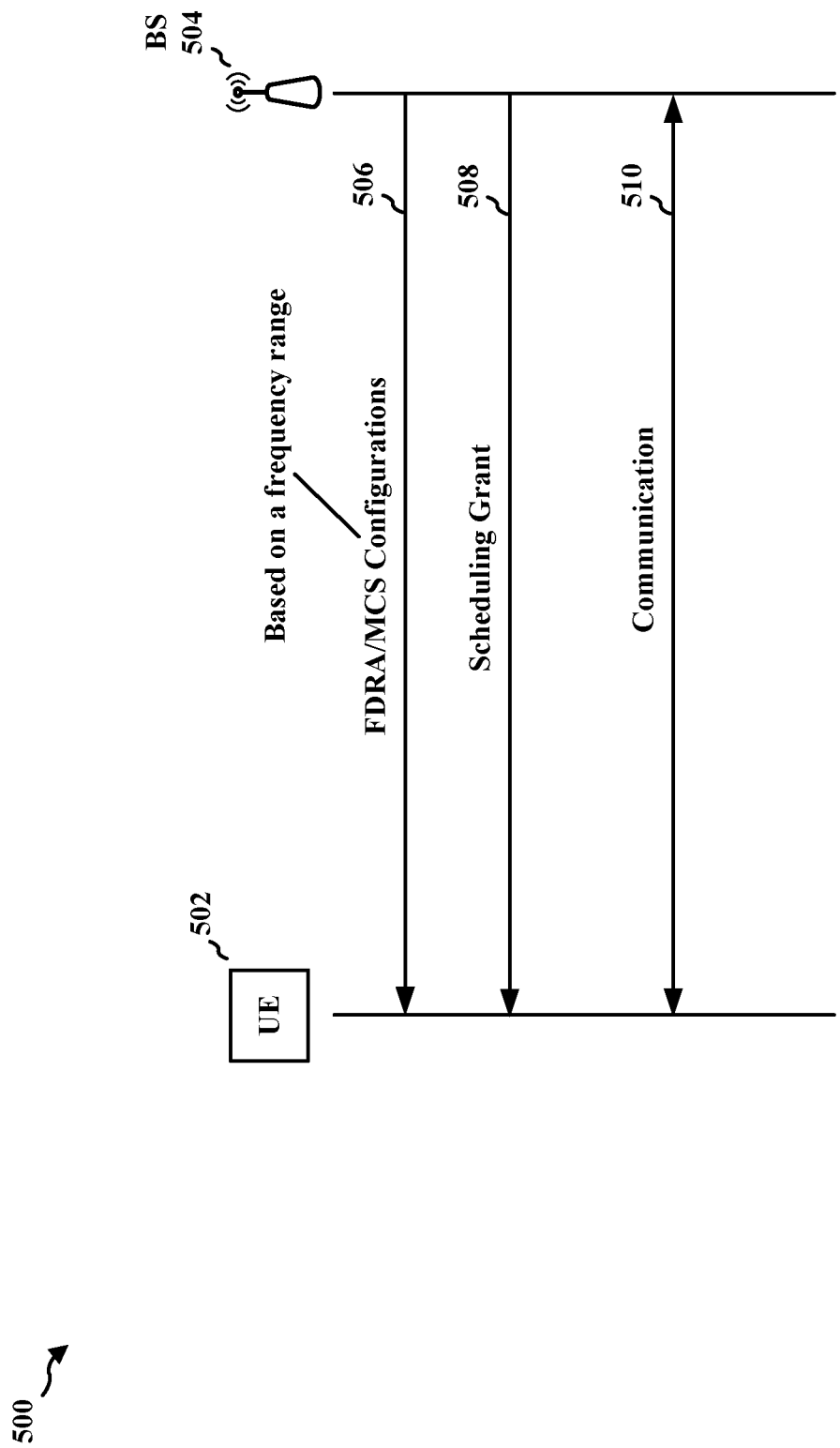
FIG. 5 is a diagram illustrating communication flow between a base station and a UE.

FIG. 5 is a diagram 500 illustrating communication flow between a base station 504 and a UE 502. The base station 504 and the UE 502 may be in communication with each other using FR4. As illustrated in FIG. 5, the base station 504 may transmit one or more FDRA or MCS configurations 506 to the UE 502. In some aspects, the one or more FDRA or MCS configurations 506 may be transmitted via RRC signaling. In some aspects, the one or more FDRA or MCS configurations 506 may include an RBG size table associated with FDRA based on the frequency range that the base station 504 and the UE 502 may operate in, such as FR4. For example, an example RBG size table, e.g., Table 4 below, may include an additional configuration with NR4. RRC signaling may choose one of the configurations.

TABLE 4

| Bandwidth Part Size | Configuration 1 | Configuration 2 | Configuration 3 |
|---|---|---|---|
| 1-36 | 2 | 4 | 16 |
| 37-72 | 4 | 8 | 32 |
| 73-144 | 8 | 16 | 64 |
| 145-275 | 16 | 16 | 64 |

As another example, an example RBG size table, e.g., Table 5 below, may include different sizes for configurations 1 and 2.

TABLE 5

| Bandwidth Part Size | Configuration 1 | Configuration 2 |
|---|---|---|
| 1-36 | 8 | 16 |
| 37-72 | 16 | 32 |
| 73-144 | 32 | 64 |
| 145-275 | 64 | 64 |

In some aspects, the base station 504 may further transmit a scheduling grant 508 including DCI to the UE 502. In some aspects where RBG size table and MCS table may be included in the one or more FDRA or MCS configurations 506, the scheduling grant 508 may include a DCI that may include a field selecting an FDRA or MCS.

In some aspects, the one or more FDRA or MCS configurations 506 may include a single FDRA or MCS configuration (instead of including multiple configurations in a table), and the scheduling grant 508 may include a DCI that may not include a field selecting an FDRA or MCS. The UE 502 may accordingly use the single FDRA or MCS configuration in the one or more FDRA or MCS configurations 506. For example, in some aspects, for FDRA, all RBs of the BWP may be used. As another example, in some aspects, for FDRA, a fixed number of RBs based on concurrent UEs in the beam may be used. As another example, in some aspects, for FDRA, a slot-dependent RB allocation may be used. For example, one or more defined slots, such as even-numbered slots may use a defined portion, such as a lower half of a BWP and one or more other defined slots, such as odd-numbered slots, may use another defined portion, such as an upper half of a BWP. In some aspects, the one or more FDRA or MCS configurations 506 may include a fixed single MCS. By including a single FDRA or MCS configuration in the one or more FDRA or MCS configurations 506, signaling overhead in the DCI in the scheduling grant 508 may be reduced.

In some aspects, the one or more FDRA or MCS configurations 506 may include several options of FDRA or MCS, and a DCI in the scheduling grant 508 may select one option. In some aspects, for FDRA, RRC may configure (e.g., by transmitting the one or more FDRA or MCS configurations 506) RIVs or bitmaps and the DCI (e.g., the DCI in the scheduling grant 508) may select one RIV or one bitmap.

In some aspects, for FDRA, a BWP may be divided into several segments of different size, and the DCI (e.g., the DCI in the scheduling grant 508) may indicate which segment to allocate. For example, the BWP may be divided into 2 segments, and there may be a 1-bit field in DCI (e.g., the DCI in the scheduling grant 508) to indicate which segment to choose. As another example, the BWP may be divided into 4 segments, and there may be a 2-bit field in DCI (e.g., the DCI in the scheduling grant 508) to indicate which segment to choose. The BWP may be divided into N segments, and there may be a M-bit field in DCI (e.g., the DCI in the scheduling grant 508) to indicate which segment to choose. In some aspects, by way of example, N and M may be positive integers. In some aspects, $2^M$ may equal to N or M may equal to N. In some aspects, the signaling overhead in the DCI in the scheduling grant 508 may be smaller because fewer bits may be used to indicate the options for FDRA or MCS. Because FR4 channels may be more stable, FDRA or MCS may be changed to a smaller degree (and/or less often). By providing FDRA or MCS configurations based on the frequency range, communications may be more efficient.

Figure 6:
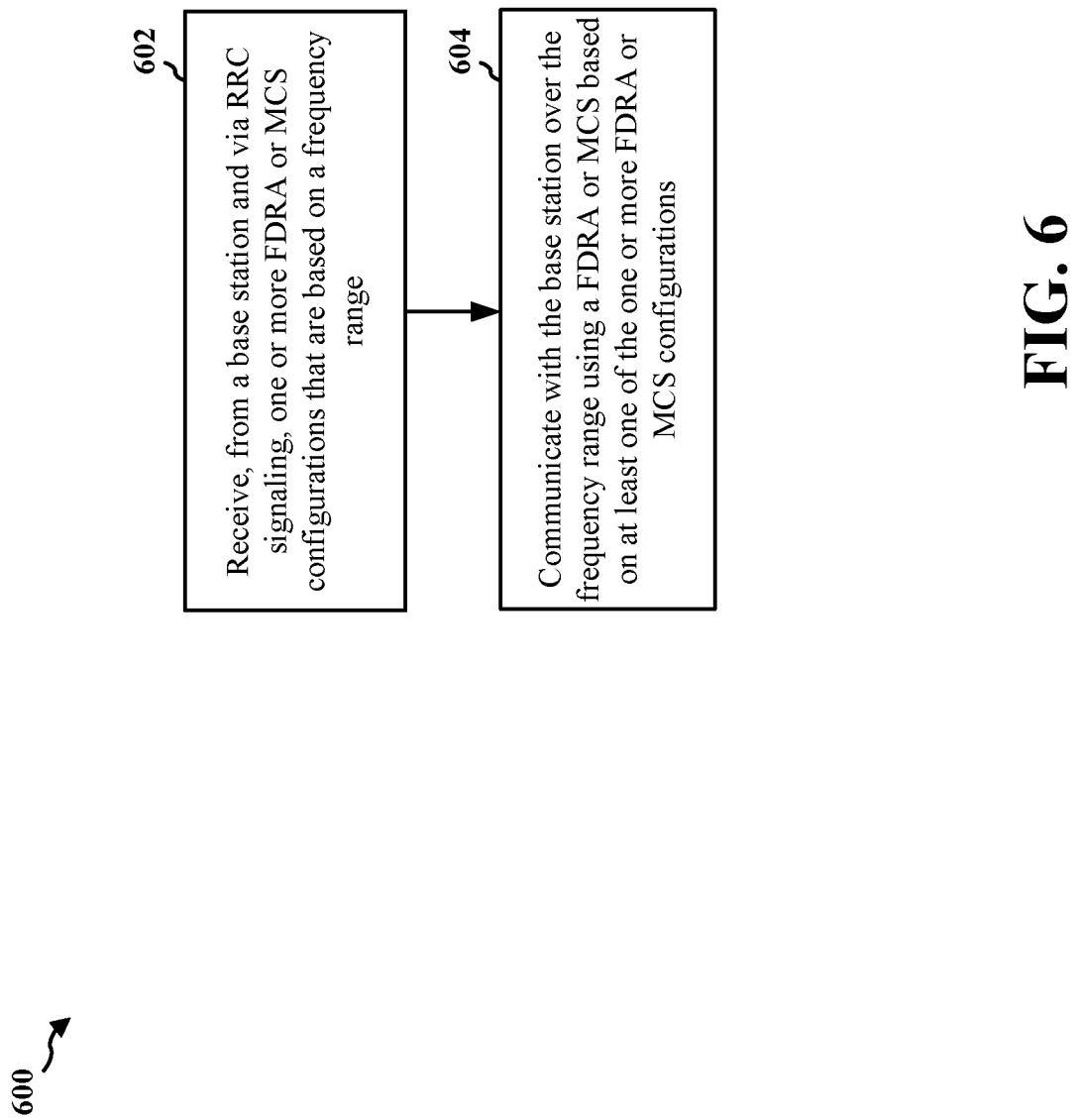
FIG. 6 is a flowchart of a method of wireless communication.

FIG. 6 is a flowchart 600 of a method of wireless communication. The method may be performed by a UE (e.g., the UE 104, the UE 404A/B, the UE 502; the apparatus 1002).

At 602, the UE may receive, from a base station and via RRC signaling, one or more FDRA or MCS configurations that are based on a frequency range. For example, the UE 502 may receive, from a base station 504 and via RRC signaling, one or more FDRA or MCS configurations 506 that are based on a frequency range. In some aspects, 602 may be performed by configuration component 1042 in FIG. 10.

At 604, the UE may communicate with the base station over the frequency range using an FDRA or MCS based on at least one of the one or more FDRA or MCS configurations. For example, the UE 502 may communicate with the base station (e.g., by exchanging communication 510) over the frequency range using an FDRA or MCS based on at least one of the one or more FDRA or MCS configurations 506. In some aspects, 604 may be performed by communication component 1044 in FIG. 10.

Figure 7:
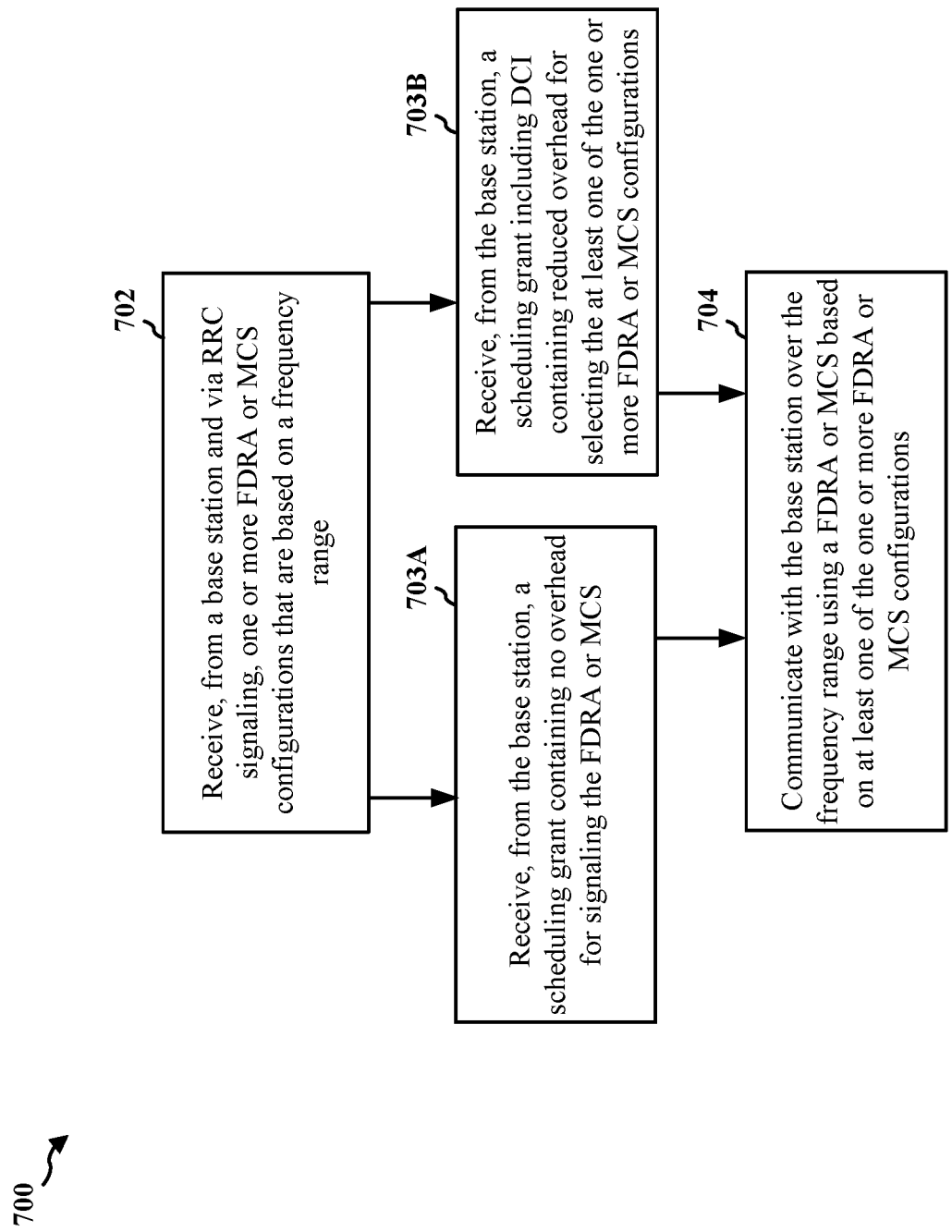
FIG. 7 is a flowchart of a method of wireless communication.

FIG. 7 is a flowchart 700 of a method of wireless communication. The method may be performed by a UE (e.g., the UE 104, the UE 404A/B, the UE 502; the apparatus 1002).

At 702, the UE may receive, from a base station and via RRC signaling, one or more FDRA or MCS configurations that are based on a frequency range. For example, the UE 502 may receive, from a base station 504 and via RRC signaling, one or more FDRA or MCS configurations 506 that are based on a frequency range. In some aspects, 702 may be performed by configuration component 1042 in FIG. 10. In some aspects, the RRC may configure an RBG size table or an MCS table associated with the one or more FDRA or MCS configurations. In some aspects, the RBG size table or the MCS table may be based on the frequency range. In some aspects, the frequency range may include a frequency higher than 71 GHz.

In some aspects, at 703A, the UE may receive, from the base station, a scheduling grant containing no overhead for signaling the FDRA or MCS. For example, the UE 502 may receive, from the base station 504, a scheduling grant 508 containing no overhead for signaling the FDRA or MCS. In some aspects, 703A may be performed by scheduling component 1046 in FIG. 10. In some aspects, the at least one of the one or more FDRA or MCS configurations may be equivalent to the one or more FDRA or MCS configurations. In some aspects, the one or more FDRA or MCS configurations may define a fixed number of RBs. In some aspects, the fixed number of RBs may correspond to all RBs of a BWP. In some aspects, the one or more FDRA or MCS configurations may define the fixed number of RBs based on one or more concurrent UEs in a beam. In some aspects, the one or more FDRA or MCS configurations may define the fixed number of RBs based on one or more slots. In some aspects, the one or more FDRA or MCS configurations may define a fixed MCS.

In some aspects, at 703B, the UE may receive, from the base station, a scheduling grant including DCI containing reduced overhead for selecting the at least one of the one or more FDRA or MCS configurations. For example, the UE 502 may receive, from the base station 504, a scheduling grant 508 including DCI containing reduced overhead for selecting the at least one of the one or more FDRA or MCS configurations. In some aspects, 703B may be performed by scheduling component 1046 in FIG. 10. In some aspects, the one or more FDRA or MCS configurations may include one or more RIVs or bitmaps. In some aspects, the DCI may select at least one RIV or bitmap from the one or more RIVs or bitmaps. In some aspects, the one or more FDRA or MCS configurations may include one or more segments of a BWP. In some aspects, the DCI may select at least one segment of the one or more segments.

At 704, the UE may communicate with the base station over the frequency range using an FDRA or MCS based on at least one of the one or more FDRA or MCS configurations. For example, the UE 502 may communicate with the base station (e.g., by exchanging communication 510) over the frequency range using an FDRA or MCS based on at least one of the one or more FDRA or MCS configurations 506. In some aspects, 704 may be performed by communication component 1044 in FIG. 10.

Figure 8:
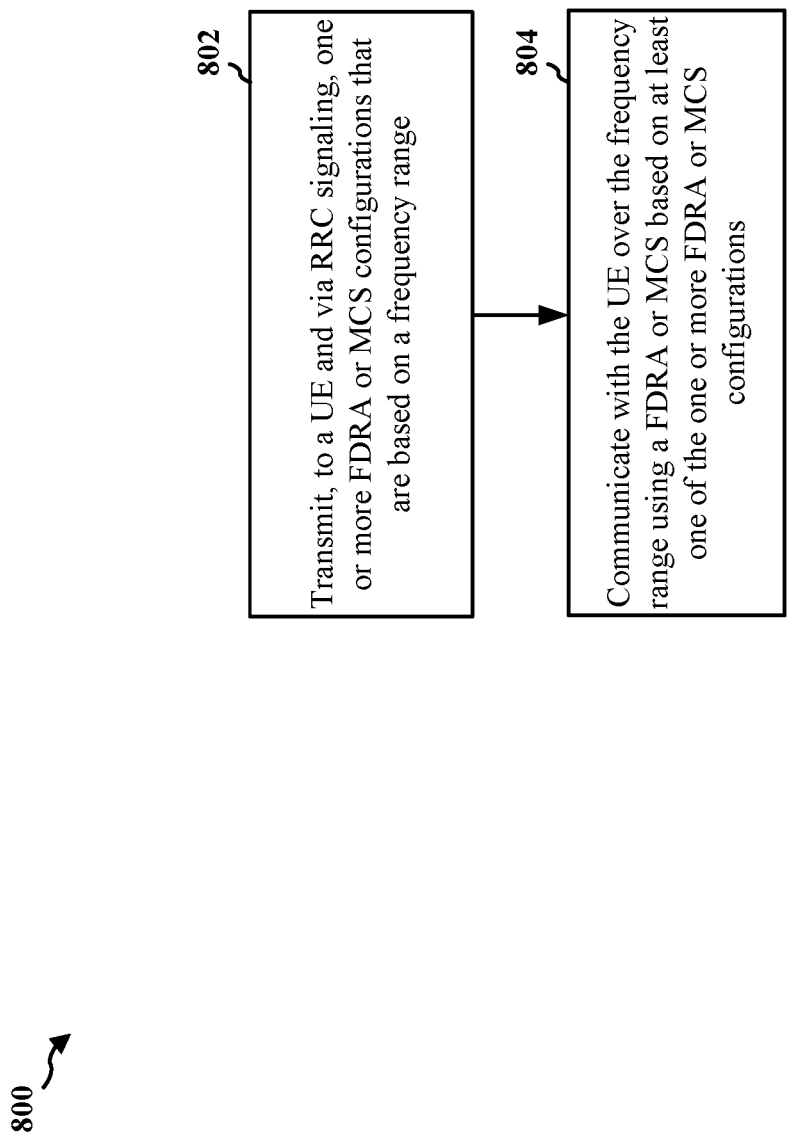
FIG. 8 is a flowchart of a method of wireless communication.

FIG. 8 is a flowchart 800 of a method of wireless communication. The method may be performed by a base station (e.g., the base station 102/180, the base station 402, the base station 504; the apparatus 1102).

At 802, the base station may transmit, to a UE and via RRC signaling, one or more FDRA or MCS configurations that are based on a frequency range. For example, the base station 504 may transmit, to a UE 502 and via RRC signaling, one or more FDRA or MCS configurations 506 that are based on a frequency range. In some aspects, 802 may be performed by configuration component 1142 in FIG. 11.

At 804, the base station may communicate with the UE over the frequency range using an FDRA or MCS based on at least one of the one or more FDRA or MCS configurations. For example, the base station 504 may communicate with the UE 502 (e.g., by exchanging communication 510) over the frequency range using an FDRA or MCS based on at least one of the one or more FDRA or MCS configurations 506. In some aspects, 804 may be performed by communication component 1144 in FIG. 11.

Figure 9:
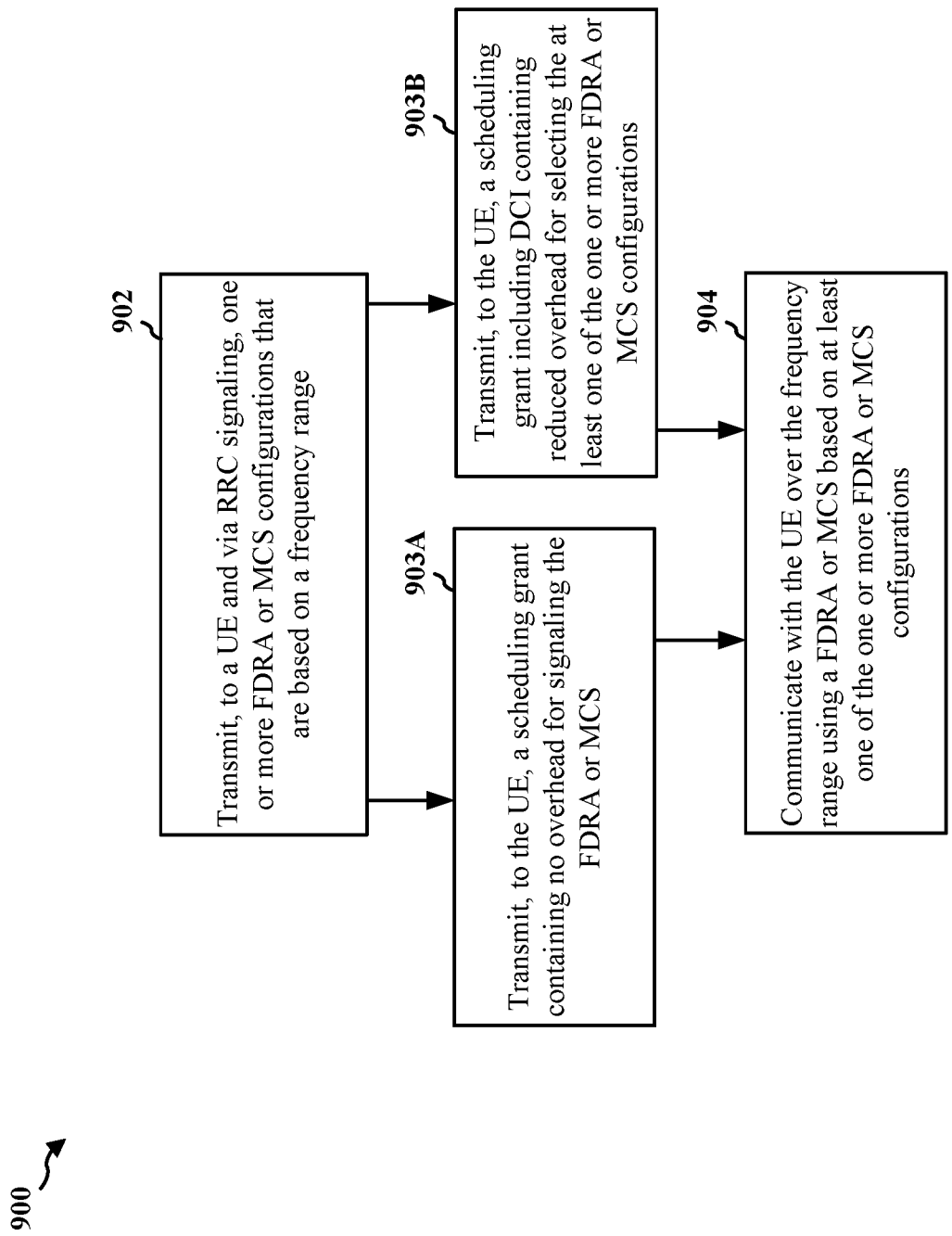
FIG. 9 is a flowchart of a method of wireless communication.

FIG. 9 is a flowchart 900 of a method of wireless communication. The method may be performed by a base station (e.g., the base station 102/180, the base station 402, the base station 504; the apparatus 1102).

At 902, the base station may transmit, to a UE and via RRC signaling, one or more FDRA or MCS configurations that are based on a frequency range. For example, the base station 504 may transmit, to a UE 502 and via RRC signaling, one or more FDRA or MCS configurations 506 that are based on a frequency range. In some aspects, 902 may be performed by configuration component 1142 in FIG. 11. In some aspects, the RRC may configure an RBG size table or an MCS table associated with the one or more FDRA or MCS configurations. In some aspects, the RBG size table or the MCS table may be based on the frequency range. In some aspects, the frequency range may include a frequency higher than 71 GHz.

In some aspects, at 903A, the base station may transmit, to the UE, a scheduling grant containing no overhead for signaling the FDRA or MCS. For example, the base station 504 may transmit, to the UE 502, a scheduling grant 508 containing no overhead for signaling the FDRA or MCS. In some aspects, 903A may be performed by scheduling component 1146 in FIG. 11. In some aspects, the at least one of the one or more FDRA or MCS configurations may be equivalent to the one or more FDRA or MCS configurations. In some aspects, the one or more FDRA or MCS configurations may define a fixed number of RBs. In some aspects, the fixed number of RBs may correspond to all RBs of a BWP. In some aspects, the one or more FDRA or MCS configurations may define the fixed number of RBs based on one or more concurrent UEs in a beam. In some aspects, the one or more FDRA or MCS configurations may define the fixed number of RBs based on one or more slots. In some aspects, the one or more FDRA or MCS configurations may define a single MCS.

In some aspects, at 903B, the base station may transmit, to the UE, a scheduling grant including DCI containing reduced overhead for selecting the at least one of the one or more FDRA or MCS configurations. For example, the base station 504 may transmit, to the UE 502, a scheduling grant 508 including DCI containing reduced overhead for selecting the at least one of the one or more FDRA or MCS configurations. In some aspects, 903B may be performed by scheduling component 1146 in FIG. 11. In some aspects, the one or more FDRA or MCS configurations may include one or more RIVs or bitmaps. In some aspects, the DCI may select at least one RIV or bitmap from the one or more RIVs or bitmaps. In some aspects, the one or more FDRA or MCS configurations may include one or more segments of a BWP. In some aspects, the DCI may select at least one segment of the one or more segments.

At 904, the base station may communicate with the UE over the frequency range using an FDRA or MCS based on at least one of the one or more FDRA or MCS configurations. For example, the base station 504 may communicate with the UE 502 (e.g., by exchanging communication 510) over the frequency range using an FDRA or MCS based on at least one of the one or more FDRA or MCS configurations 506. In some aspects, 904 may be performed by communication component 1144 in FIG. 11.

Figure 10:
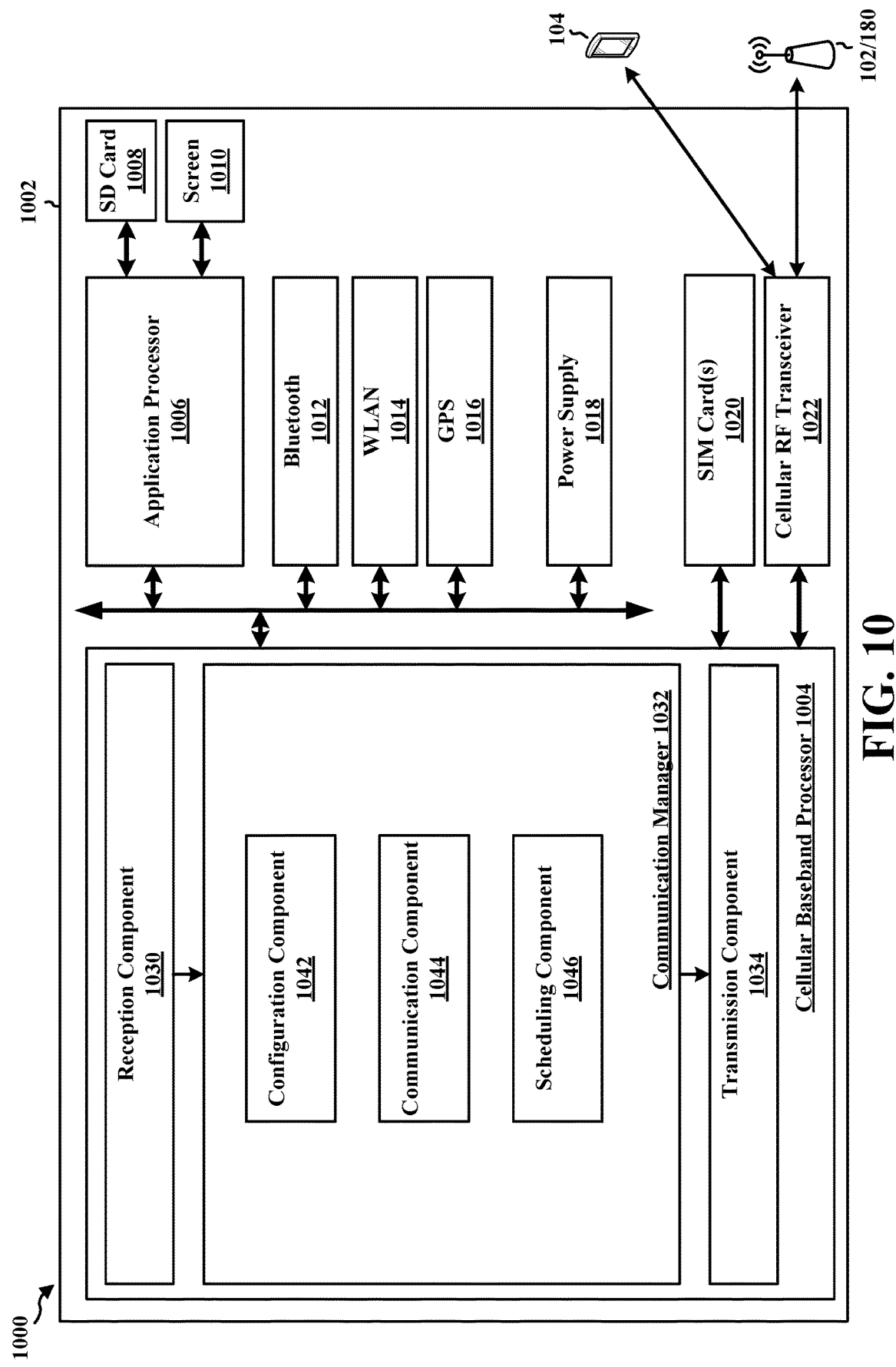
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 may include a configuration component 1042 that is configured to receive, from a base station and via RRC signaling, one or more FDRA or MCS configurations that are based on a frequency range, e.g., as described in connection with 602 in FIG. 6, or 702 in FIG. 7. The communication manager 1032 may further include a communication component 1044 that may be configured to communicate with the base station over the frequency range using an FDRA or MCS based on at least one of the one or more FDRA or MCS configurations, e.g., as described in connection with 604 in FIG. 6, or 704 in FIG. 7. The communication manager 1032 may further include a scheduling component 1046 that may be configured to receive, from the base station, a scheduling grant, e.g., as described in connection with 703A/B in FIG. 7.

The apparatus may include additional components that perform each of the blocks of the algorithm in the flowcharts of FIGS. 6-7. As such, each block in the flowcharts of FIGS. 6-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, may include means for receiving, from a base station and via RRC signaling, one or more FDRA or MCS configurations that are based on a frequency range. The cellular baseband processor 1004 may further include means for receiving, from the base station, a scheduling grant containing no overhead for signaling the FDRA or MCS. The cellular baseband processor 1004 may further include means for receiving, from the base station, a scheduling grant including DCI containing reduced overhead for selecting the at least one of the one or more FDRA or MCS configurations. The cellular baseband processor 1004 may further include means for communicating with the base station over the frequency range using an FDRA or MCS based on at least one of the one or more FDRA or MCS configurations. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
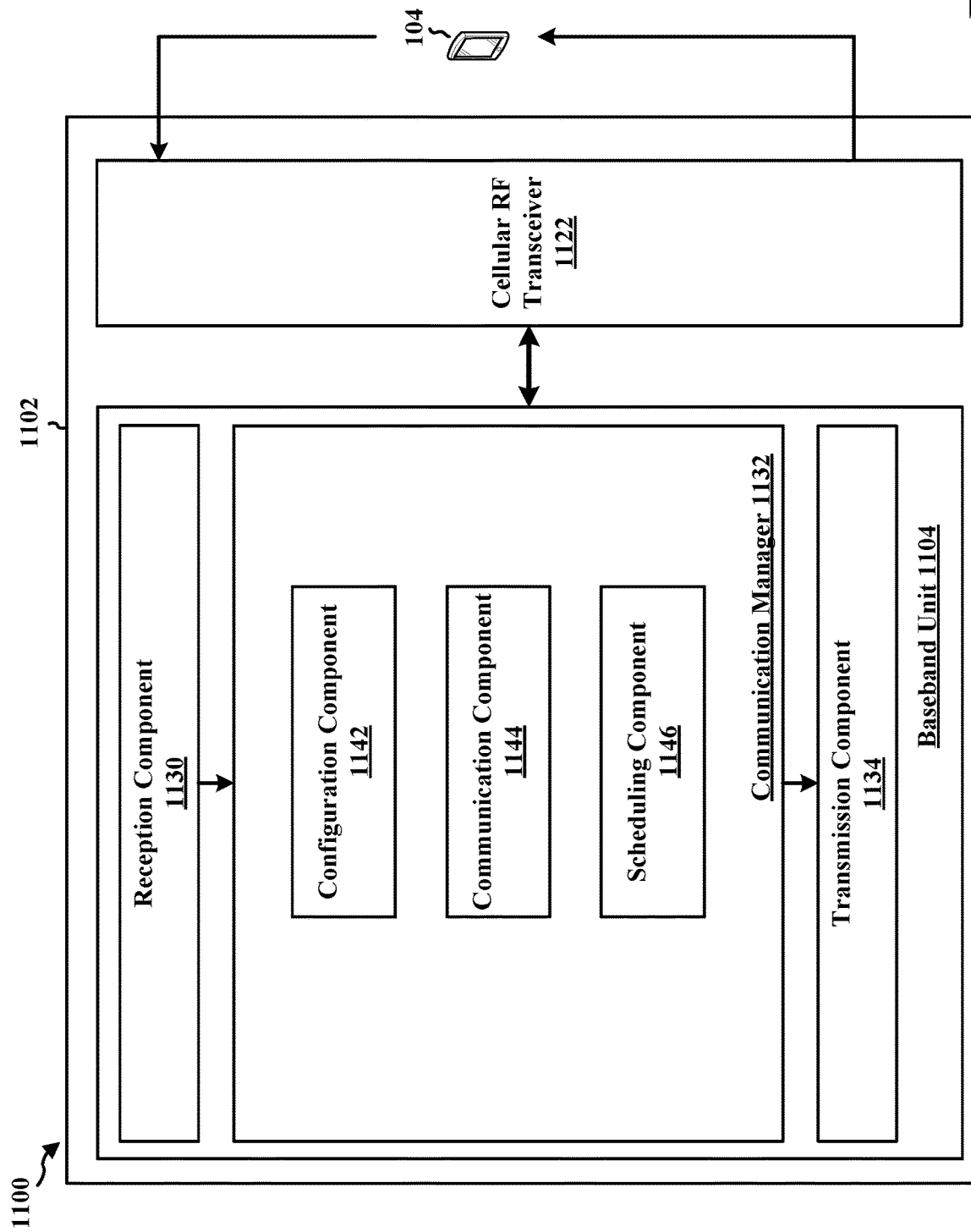
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1002 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 may include a configuration component 1142 that may transmit, to a UE and via RRC signaling, one or more FDRA or MCS configurations that are based on a frequency range, e.g., as described in connection with 802 in FIG. 8, or 902 in FIG. 9 The communication manager 1132 further may include a communication component 1144 that may communicate with the UE over the frequency range using an FDRA or MCS based on at least one of the one or more FDRA or MCS configurations, e.g., as described in connection with 804 in FIG. 8, or 904 in FIG. 9. The communication manager 1132 further may include a scheduling component 1146 that may transmit, to the UE, a scheduling grant, e.g., as described in connection with 903A/B in FIG. 9.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, may include means for transmitting, to a UE and via RRC signaling, one or more FDRA or MCS configurations that are based on a frequency range. The baseband unit 1104 may further include means for transmitting, to the UE, a scheduling grant including DCI containing reduced overhead for selecting the at least one of the one or more FDRA or MCS configurations. The baseband unit 1104 may further include means for transmitting, to the UE, a scheduling grant containing no overhead for signaling the FDRA or MCS. The baseband unit 1104 may further include means for communicating with the UE over the frequency range using an FDRA or MCS based on at least one of the one or more FDRA or MCS configurations. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Example aspects provided herein may facilitate more efficient FDRA or MCS for some frequency ranges. UEs operating in different frequency ranges may experience different environments. For example, UEs operating in FR4 may be operating in a fixed point to point or fixed point to multi-point environment where the UEs may be low mobility (or stationary). Configured with FDRA or MCS configurations based on the frequency range, UEs in accordance with example aspects may be able to utilize FDRA or MCS that may be more efficient for the frequency range that the UEs operate in.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from a base station and via RRC signaling, one or more FDRA or MCS configurations that are based on a frequency range; and communicate with the base station over the frequency range, using an FDRA or MCS based on at least one of the one or more FDRA or MCS configurations.

Aspect 2 is the apparatus of aspect 1, wherein the RRC configures a RBG size table or an MCS table associated with the one or more FDRA or MCS configurations, the RBG size table or the MCS table being based on the frequency range, and wherein the frequency range comprises a frequency higher than 71 GHz.

Aspect 3 is the apparatus of any of aspects 1-2, wherein the at least one processor coupled to the memory is further configured to: receive, from the base station, a scheduling grant containing no overhead for signaling the FDRA or MCS.

Aspect 4 is the apparatus of any of aspects 1-3, wherein the at least one of the one or more FDRA or MCS configurations is equivalent to the one or more FDRA or MCS configurations, and wherein the one or more FDRA or MCS configurations define a fixed number of RBs.

Aspect 5 is the apparatus of any of aspects 1-4, wherein the fixed number of RBs correspond to all RBs of a BWP.

Aspect 6 is the apparatus of any of aspects 1-5, wherein the one or more FDRA or MCS configurations define the fixed number of RBs based on one or more concurrent UEs in a beam.

Aspect 7 is the apparatus of any of aspects 1-6, wherein the one or more FDRA or MCS configurations define the fixed number of RBs based on one or more slots.

Aspect 8 is the apparatus of any of aspects 1-7, wherein the one or more FDRA or MCS configurations define the MCS.

Aspect 9 is the apparatus of any of aspects 1-2 or any of aspects 4-8, wherein the at least one processor coupled to the memory is further configured to: receive, from the base station, a scheduling grant comprising DCI containing reduced overhead for selecting the at least one of the one or more FDRA or MCS configurations.

Aspect 10 is the apparatus of any of aspects 1-9, wherein the one or more FDRA or MCS configurations comprise one or more RIVs or bitmaps, and wherein the DCI selects at least one RIV or bitmap from the one or more RIVs or bitmaps.

Aspect 11 is the apparatus of any of aspects 1-10, wherein the one or more FDRA or MCS configurations comprise one or more segments of a BWP, and wherein the DCI selects at least one segment of the one or more segments.

Aspect 12 is the apparatus of any of aspects 1-11, further comprising a transceiver coupled to the at least one processor.

Aspect 13 is an apparatus for wireless communication at a base station, comprising: a memory; and at least one processor coupled to the memory and configured to: transmit, to a UE and via RRC signaling, one or more FDRA or MCS configurations that are based on a frequency range; and communicate with the UE over the frequency range, using an FDRA or MCS based on at least one of the one or more FDRA or MCS configurations.

Aspect 14 is the apparatus of aspect 13, wherein the RRC defines a RBG size table or an MCS table associated with the one or more FDRA or MCS configurations, the RBG size table or the MCS table being larger based on the frequency range, and wherein the frequency range comprises a frequency higher than 71 GHz.

Aspect 15 is the apparatus of any of aspects 13-14, wherein the at least one processor coupled to the memory is further configured to: transmit, to the UE, a scheduling grant containing no overhead for signaling the FDRA or MCS.

Aspect 16 is the apparatus of any of aspects 13-15, wherein the at least one of FDRA or MCS is equivalent to the one or more FDRA or MCS configurations, and wherein the one or more FDRA or MCS configurations define a fixed number of RBs.

Aspect 17 is the apparatus of any of aspects 13-16, wherein the fixed number of RBs correspond to all RBs of a BWP.

Aspect 18 is the apparatus of any of aspects 13-17, wherein the one or more FDRA or MCS configurations define the fixed number of RBs based on one or more concurrent UEs in a beam.

Aspect 19 is the apparatus of any of aspects 13-18, wherein the one or more FDRA or MCS configurations define the fixed number of RBs based on one or more slots.

Aspect 20 is the apparatus of any of aspects 13-19, wherein the one or more FDRA or MCS configurations define the MCS.

Aspect 21 is the apparatus of any of aspects 13-14 or any of aspects 16-20, wherein the at least one processor coupled to the memory is further configured to: transmit, to the UE, a scheduling grant comprising DCI containing reduced overhead for selecting the at least one of the one or more FDRA or MCS configurations.

Aspect 22 is the apparatus of any of aspects 13-21, wherein the one or more FDRA or MCS configurations comprise one or more RIVs or bitmaps, and wherein the DCI selects at least one RIV or bitmap from the one or more RIVs or bitmaps.

Aspect 23 is the apparatus of any of aspects 13-22, wherein the one or more FDRA or MCS configurations comprise one or more segments of a BWP, and wherein the DCI selects at least one segment of the one or more segments.

Aspect 24 is the apparatus of any of aspects 13-23, further comprising a transceiver coupled to the at least one processor.

Aspect 25 is a method of wireless communication for implementing any of aspects 1 to 12.

Aspect 26 is an apparatus for wireless communication including means for implementing any of aspects 1 to 12.

Aspect 27 is a computer-readable medium storing computer executable code, where the code when executed by a processor causes the processor to implement any of aspects 1 to 12.

Aspect 28 is a method of wireless communication for implementing any of aspects 13 to 24.

Aspect 29 is an apparatus for wireless communication including means for implementing any of aspects 13 to 24.

Aspect 30 is a computer-readable medium storing computer executable code, where the code when executed by a processor causes the processor to implement any of aspects 13 to 24.

What is claimed is:

1. An apparatus for wireless communication at a user equipment (UE), comprising:
   memory; and
   at least one processor coupled to the memory and configured to:
      receive, from a base station and via radio resource control (RRC) signaling, one or more frequency domain resource allocation (FDRA) or modulation and coding scheme (MCS) configurations that are based on a frequency range; and
      communicate with the base station over the frequency range, using an FDRA or MCS based on at least one of the one or more FDRA or MCS configurations.

2. The apparatus of claim 1, wherein the RRC signaling configures a resource block group (RBG) size table or an MCS table associated with the one or more FDRA or MCS configurations, the RBG size table or the MCS table being based on the frequency range, and wherein the frequency range comprises a frequency higher than 71 gigahertz (GHz).

3. The apparatus of claim 1, wherein the at least one processor coupled to the memory is further configured to:
   receive, from the base station, a scheduling grant containing no overhead for signaling the FDRA or MCS.

4. The apparatus of claim 3, wherein the at least one of the one or more FDRA or MCS configurations is equivalent to the one or more FDRA or MCS configurations, and wherein the one or more FDRA or MCS configurations define a fixed number of resource blocks (RBs).

5. The apparatus of claim 4, wherein the fixed number of RBs correspond to all RBs of a bandwidth part (BWP).

6. The apparatus of claim 4, wherein the one or more FDRA or MCS configurations define the fixed number of RBs based on one or more concurrent UEs in a beam.

7. The apparatus of claim 4, wherein the one or more FDRA or MCS configurations define the fixed number of RBs based on one or more slots.

8. The apparatus of claim 3, wherein the one or more FDRA or MCS configurations define the MCS.

9. The apparatus of claim 1, wherein the at least one processor coupled to the memory is further configured to:
   receive, from the base station, a scheduling grant comprising DCI containing reduced overhead for selecting the at least one of the one or more FDRA or MCS configurations.

10. The apparatus of claim 9, wherein the one or more FDRA or MCS configurations comprise one or more resource indication values (RIVs) or bitmaps, and wherein the DCI is configured to select at least one RIV or bitmap from the one or more RIVs or bitmaps.

11. The apparatus of claim 9, wherein the one or more FDRA or MCS configurations comprise one or more segments of a bandwidth part (BWP), and wherein the DCI is configured to select at least one segment of the one or more segments.

12. The apparatus of claim 1, further comprising a transceiver coupled to the at least one processor.

13. An apparatus for wireless communication at a base station, comprising:
    memory; and
    at least one processor coupled to the memory and configured to:
       transmit, to a user equipment (UE) and via radio resource control (RRC) signaling, one or more frequency domain resource allocation (FDRA) or modulation and coding scheme (MCS) configurations that are based on a frequency range; and
       communicate with the UE over the frequency range, using an FDRA or MCS based on at least one of the one or more FDRA or MCS configurations.

14. The apparatus of claim 13, wherein the RRC signaling defines a resource block group (RBG) size table or an MCS table associated with the one or more FDRA or MCS configurations, the RBG size table or the MCS table being larger based on the frequency range, and wherein the frequency range comprises a frequency higher than 71 gigahertz (GHz).

15. The apparatus of claim 13, wherein the at least one processor coupled to the memory is further configured to:
    transmit, to the UE, a scheduling grant containing no overhead for signaling the FDRA or MCS.

16. The apparatus of claim 15, wherein the at least one of FDRA or MCS is equivalent to the one or more FDRA or MCS configurations, and wherein the one or more FDRA or MCS configurations define a fixed number of resource blocks (RBs).

17. The apparatus of claim 16, wherein the fixed number of RBs correspond to all RBs of a bandwidth part (BWP).

18. The apparatus of claim 16, wherein the one or more FDRA or MCS configurations define the fixed number of RBs based on one or more concurrent UEs in a beam.

19. The apparatus of claim 16, wherein the one or more FDRA or MCS configurations define the fixed number of RBs based on one or more slots.

20. The apparatus of claim 15, wherein the one or more FDRA or MCS configurations define the MCS.

21. The apparatus of claim 13, wherein the at least one processor coupled to the memory is further configured to:
    transmit, to the UE, a scheduling grant comprising DCI containing reduced overhead for selecting the at least one of the one or more FDRA or MCS configurations.

22. The apparatus of claim 21, wherein the one or more FDRA or MCS configurations comprise one or more resource indication values (RIVs) or bitmaps, and wherein the DCI is configured to select at least one RIV or bitmap from the one or more RIVs or bitmaps.

23. The apparatus of claim 21, wherein the one or more FDRA or MCS configurations comprise one or more segments of a bandwidth part (BWP), and wherein the DCI is configured to select at least one segment of the one or more segments.

24. The apparatus of claim 13, further comprising a transceiver coupled to the at least one processor.

25. A method for wireless communication at a user equipment (UE), comprising:
    receiving, from a base station and via radio resource control (RRC) signaling, one or more frequency domain resource allocation (FDRA) or modulation and coding scheme (MCS) configurations that are based on a frequency range; and
    communicating with the base station over the frequency range, using an FDRA or MCS based on at least one of the one or more FDRA or MCS configurations.

26. The method of claim 25, wherein the RRC signaling configures a resource block group (RBG) size table or an MCS table associated with the one or more FDRA or MCS configurations, the RBG size table or the MCS table being based on the frequency range, and wherein the frequency range comprises a frequency higher than 71 gigahertz (GHz).

27. The method of claim 25, further comprising:
receiving, from the base station, a scheduling grant containing no overhead for signaling the FDRA or MCS.

28. A method for wireless communication at a base station, comprising:
transmitting, to a user equipment (UE) and via radio resource control (RRC) signaling, one or more frequency domain resource allocation (FDRA) or modulation and coding scheme (MCS) configurations that are based on a frequency range; and
communicating with the UE over the frequency range, using an FDRA or MCS based on at least one of the one or more FDRA or MCS configurations.

29. The method of claim 28, wherein the RRC signaling defines a resource block group (RBG) size table or an MCS table associated with the one or more FDRA or MCS configurations, the RBG size table or the MCS table being larger based on the frequency range, and wherein the frequency range comprises a frequency higher than 71 gigahertz (GHz).

30. The method of claim 28, further comprising:
transmitting, to the UE, a scheduling grant containing no overhead for signaling the FDRA or MCS.

* * * * *